United States Patent [19]
Johnson et al.

[11] Patent Number: 5,247,644
[45] Date of Patent: Sep. 21, 1993

[54] PROCESSING SYSTEM WITH IMPROVED SEQUENTIAL MEMORY ACCESSING

[75] Inventors: William M. Johnson; David B. Witt, both of Austin, Tex.

[73] Assignee: Advanced Micro Devices, Inc., Sunnyvale, Calif.

[21] Appl. No.: 651,128

[22] Filed: Feb. 6, 1991

[51] Int. Cl.$^5$ .................. G06F 12/00; G06F 12/06; G06C 7/00; G06C 8/00
[52] U.S. Cl. .................. 395/425; 365/230.03; 365/230.04
[58] Field of Search .................. 395/425, 550; 365/230.03, 230.04, 239, 238.5, 233, 221; 364/DIG. 1, 243.1, 246.4, 251, 251.4, 251.7, 960, 960.2, 964, 964.33

[56] References Cited

U.S. PATENT DOCUMENTS

| | | | |
|---|---|---|---|
| 4,419,737 | 12/1983 | Yamaura et al. | 364/900 |
| 4,600,986 | 7/1986 | Scheuneman et al. | 364/200 |
| 4,680,738 | 7/1987 | Tam | 365/230.04 X |
| 4,794,566 | 12/1988 | Richards et al. | 365/230.09 X |
| 4,797,815 | 1/1989 | Moore | 364/200 |
| 4,833,657 | 5/1989 | Tanaka | 365/230.04 |
| 4,849,937 | 7/1989 | Yoshimoto | 365/230.04 X |
| 4,912,680 | 3/1990 | Masaki et al. | 365/230.09 |

FOREIGN PATENT DOCUMENTS

| | | |
|---|---|---|
| 0032136 | 1/1981 | European Pat. Off. |
| 0283115 | 2/1988 | European Pat. Off. |
| 0384620 | 2/1990 | European Pat. Off. |

OTHER PUBLICATIONS

Article entitled "Eliminate Shadow RAM with Fast EPROMs" by Norman P. Taffe and published in the Wescon Conference Record, vol. 34 Nov., 1990.

Primary Examiner—Alyssa H. Bowler
Attorney, Agent, or Firm—Foley & Lardner

[57] ABSTRACT

A processing system provides efficient accessing by a processor of a memory during a sequential memory access. The processing system includes a memory having a plurality of storage locations, each being addressable at a corresponding different storage address, a processor coupled to the memory for addressing the memory storage locations for accessing the storage locations and control means coupled to the memory and to the processor. The control means is responsive to a sequential access by the processor for causing the processor to address selected spaced apart ones of the storage locations in order and is arranged to access the other memory locations in order between the processor addresses to provide an access rate of one word of information per system clock cycle.

22 Claims, 4 Drawing Sheets

PROCESSING SYSTEM WITH IMPROVED SEQUENTIAL MEMORY ACCESSING

BACKGROUND OF THE INVENTION

The present invention generally relates to a processing system and more particularly to a processing system which exhibits improved efficiency in memory accessing during sequential memory accesses.

Processing systems are well known in the art. Such systems generally include a processor which performs executions on operand data pursuant to operating instructions and a memory for providing the processor with the operating instructions and data. The processor of such a system is also generally arranged to write data to the memory, such as resultants, resulting from the executions performed on operand data.

The reading of operating instructions and data from the memory and the writing of data to the memory are generally referred to as memory accesses by the processor. During a single access, the processor reads or writes a full or partial word of information from the memory. A full word may, for example, be 32 bits wide, and a partial word, 16 bits wide.

The memory, for storing the data and instructions, generally includes a plurality of memory locations with each location having a unique memory location address. In many instances, the memory is formed by a plurality of memory banks with each bank having a plurality of addressable storage locations. The memory banks are generally organized such that each memory location of one bank finds a corresponding memory location in the other banks having the same address except for a one- or two-bit designator which designates the memory bank in which the addressed memory location resides. For example, in a two memory bank system, a memory location of the first bank may have an address N while the corresponding memory location of the second bank may have an address of N+4. The memory addresses may be, for example, 32 bits wide with the addresses differing in the third or A(2) bit s that when the A(2) bit is zero, the first bank is addressed and when the A(2) bit is one, the second bank is addressed. As a further example, in a four memory bank system, a memory location of the first bank may have an address N while the corresponding memory location of the second, third and fourth banks would have addresses N+4, N+8, and N+12, respectively. Here, the A(3) and A(2) bits of the-32-bit address would serve as the designator to determine which bank is being addressed.

In performing memory accesses, the processor generates a memory location address and conveys the same over a multiple-bit address bus to the memory banks. For a read operation, a memory controller provides a ready signal while the memory bank having the memory storage location corresponding to the conveyed address provides the requested data or instruction from that memory location to the processor over a bi-directional, multiple-bit, data/instruction bus. For a write operation, the memory controller provides the ready signal and the processor provides the addressed memory storage location with the data over the data/instruction bus.

The timing between the processor and the memory is generally controlled by a system clock which may be external to the processor or generated by the processor. The system clock provides a series of clock cycles including a high phase and a low phase. The timing control by the system clock may be such that the processor provides addresses, control signals and data during the high phase of the system clock and receives control signals and data or instructions from the memory during the low phase.

Processing systems generally require multiple system clock cycles from the time the processor provides a memory address to when the memory either provides the requested data or instruction word in the case of a read access or to when the memory is ready to receive the data word from the processor in the case of a write access. For example, such a sequence can require two system clock cycles, four system clock cycles, or more than four system clock cycles, depending upon the design of the processing system. While such time periods for memory accesses may be acceptable for single, one word accesses, it would be desirable to speed-up this process when multiple-words of information ar to be conveyed between the processor and memory banks, as, for example, during sequential memory accessing.

The processing system of the present invention provides efficient transfer of multiple words of information between the processor and memory when the processor makes a sequential address memory access request. The present invention is more particularly of advantage when the processor makes a sequential address memory access request wherein the memory banks are interleaved. Interleaving is a process, well known in the art, wherein the address banks are sequentially addressed by a processor.

As will be seen hereinafter, the present invention provides efficient sequential address accessing by permitting the processor to address only a certain one or certain ones of the memory banks. A memory controller sequences the other memory banks in proper order to permit the microprocessor to generate the address of the memory location of the memory banks it is to address early to the end that words of information can be conveyed between the processor and the memory at a rate of one word per system clock cycle.

SUMMARY OF THE INVENTION

The invention therefore provides a processing system including memory means including a plurality of storage locations, each storage location being addressable at a corresponding different storage address, a processor coupled to the memory means for addressing the memory means storage locations for accessing the storage locations, and control means coupled to the memory means and to the processor. The control means is responsive to a sequential access of the memory means by the processor for causing the processor to address selected spaced apart ones of the storage locations in order and is further arranged for accessing the other memory locations in order between the processor addresses.

The invention further provides a processing system including memory means including a plurality of memory banks for storing data and operating instructions at addressable storage locations and a processor for generating the memory location addresses of the memory means for accessing the memory banks and for executing operations upon the data responsive to the operating instructions. The processing system further includes a first bus coupled between the processor and the memory means for conveying the data and operating instructions between the processor and the memory means and a second bus coupled between the processor and the memory means for conveying the memory location addresses from the processor to the memory means. The processing system further includes control means coupled to the memory banks and to the processor. The control means is responsive to a sequential memory access request of the processor for generating a control signal to cause the processor to sequentially address selected ones of the memory banks and for sequencing the other memory banks between the sequential addressing of the selected memory banks by the processor.

The present invention further provides a processing system including memory means including a plurality of memory banks, each memory bank including a plurality of addressable memory locations for storing data and operating instructions and a processor for executing operations upon the data in accordance with the operating instructions and for generating storage locations addresses to access the memory means for reading the data and operating instructions from the memory banks or writing data to the memory banks. The processor is further arranged to provide a first control signal when initiating a sequential access to the memory means. The processing system further includes a first bus coupled between the processor and the memory means for conveying the data and operating instructions between the processor and the memory means and a second bus coupled between the processor and the memory means for conveying the memory location addresses from the processor to the memory means. The processing system further includes control means coupled to the memory banks and to the processor. The control means is responsive to the first control signal for causing the processor to generate sequential memory location addresses for selected ones of the memory banks and for sequencing the other memory banks between the sequential memory location addresses generated by the processor. The processing system further includes a system clock for providing a repetitive clock cycle timing signal to control the timing of the memory means accesses by the processor. The processor is arranged to hold each generated storage location address valid during multiple cycles of the system clock and the control means is arranged to sequence the other memory banks as each generated storage location address is held valid by the processor to permit the processor to access a different storage location during each cycle of the system clock.

BRIEF DESCRIPTION OF THE DRAWINGS

The features of the present invention which are believed to be novel are set forth with particularity in the appended claims. The invention, together with further objects and advantages thereof, may be best be understood by making reference to the following description taken in conjunction with the accompanying drawings, in the several figures of which like reference characters identify identical elements, and wherein:

DETAILED DESCRIPTION OF THE PREFERRED EMBODIMENTS

Figure 1:
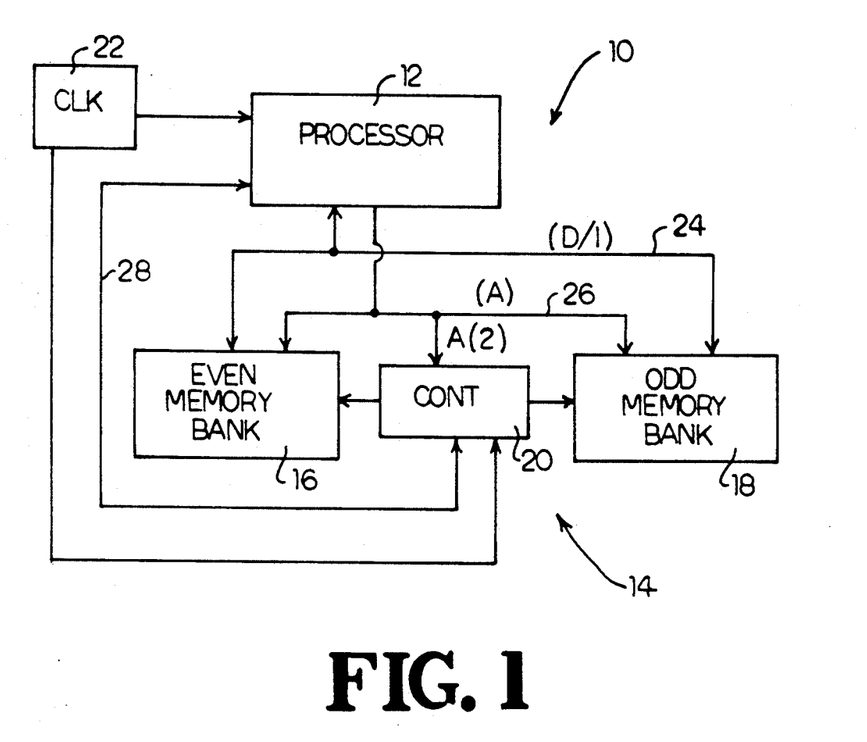
FIG. 1 is a schematic block diagram of a processing system embodying the present invention which includes a memory having a pair of memory banks.

Referring now to FIG. 1, it illustrates in schematic block diagram form, a processing system 10 structured in accordance with a first embodiment of the present invention. The processing system 10 generally includes a processor 12, a memory 14 including a first or even memory bank 16, and a second or odd memory bank 18. The processing system 10 further includes a memory controller 20 and a system clock 22.

The memory controller 20 may be external to the memory banks 16 and 18 or may be within the memory 14 comprising the memory banks 16 and 18 without departing from the present invention. The system clock 22 may be external to the processor 12 as illustrated or may be internal to the processor 12, wherein the processor 12 generates the system clock repetitive control cycles, also without departing from the present invention.

The processing system 10 further includes a first bus 24 coupled between the processor 12 and the memory banks 16 and 18. A second bus 26 is also coupled between the processor 12 and the memory banks 16 and 18.

The processor 12 is preferably of the type which performs executions upon operand data pursuant to operating instructions, wherein the processor acquires the operating instructions and operand data from the memory 14 comprising the memory banks 16 and 18. Also, the processor 12 is preferably of the type which writes resultants resulting from the executions upon the operand data pursuant to the operating instructions, to the memory 14 comprising memory banks 16 and 18. To that end, the first bus 24 comprises a data/instruction bus for conveying data and instructions between the processor 12 and the memory banks 16 and 18. The data/instruction bus 24 is preferably a 32-bit bus including individual conductors for data/instruction bits 0 through 31.

In order to obtain the data and operating instructions from the memory 14, each of the memory banks 16 and 18 includes a plurality of addressable storage locations for storing data and operating instructions. To enable the accessing of the memory banks 16 and 18, the processor 12 is arranged to generate the addresses of the storage locations, which addresses are conveyed to the memory banks 16 and 18 over the address bus 26. The address bus 26 is also preferably a 32-bit bus including individual conductors for address bits 0 through 31. The conductor corresponding to address bit A(2) is coupled to the memory controller for reasons to be explained hereinafter. When accessing the memory 14 for either reading data or instructions from the memory 14 or writing data to the memory 14, the processor 12 generates the appropriate addresses corresponding to the memory bank storage locations to be accessed and then the memory banks 16 and 18 provide the requested data/instruction or stores the data to be transferred from the processor 12 to the memory 14.

The memory banks 16 and 18 are preferably arranged such that each memory location of memory bank 16 finds a corresponding memory location in memory bank 18. The corresponding memory locations have addresses which differ by a designator contained within address bit A(2). As a result, a memory location in memory bank 16 having address N will find a corresponding memory location in memory bank 18 having an address N+4. In other words, the memory bank 16 is addressed when the A(2) bit is a zero and the memory bank 18 is addressed when the address bit A(2) is a one.

The memory locations of memory banks 16 and 18 are arranged sequentially. The memory locations of memory bank 16 are arranged so that the sequential address for the storage locations in memory bank 16 will be, for example, N, N+8, N+16, et cetera. Correspondingly, the memory locations of memory bank 18 will be in a sequence having addresses N+4, N+12, N+20, et cetera.

As will be seen hereinafter, when the processor 12 requests a sequential access to the memory 14, the memory banks 16 and 18 will be interleaved such that the processor 12 receives data or instruction words or transfers data words to the memory banks 16 and 18 in sequence, as for example, first to memory 16 at address N, then memory bank 18 at address N+4, then memory bank 16 at address N+8, and then to memory bank 18 at address N+12.

A control bus 28 also couples the processor 12 to the memory controller 20. The control bus 28 conveys various control signals between the processor 12 and memory controller 20 which will be further described hereinafter. These control signals assist in the coordination of a memory access from the processor 12 to the memory 14.

The system clock 22 is coupled to both the processor 12 and the memory controller 20. It provides timing control between the processor 12 and the memory controller 20. The system clock 22 provides a repetitive series of clock cycles which include a high phase and a low phase. The processing system 10 is preferably arranged such that during the high phase of the system clock 22, the processor 12 initiates memory addresses, control signals, and data and during the low phase, the memory 14 or controller 20 initiates control signals and data or operating instructions.

In accordance with the prior art, a simple access by the processor 12 to the memory 14 may take two system clock cycles to complete. In order to render information transfer more efficient, the processor 12 is arranged to request a sequential memory access to obtain data or instruction words or write data words to the memory at a rate of one word per system cycle. For purposes of this preferred embodiment, it is assumed that a word of information contains 32 bits. However, partial words of information may also be conveyed, as for example 16 bits, wherein the selection of a whole word or partial word is made by address bits A(0) and A(1).

The control signals conveyed between the processor 12 and memory controller 20 over control bus 28 are identified herein as *REQ, R/*W, *BURST, *RDY, and *ERLYA. Each of these control signals is defined hereinafter.

*REQ is a signal generated by the processor upon requesting a memory access. When this signal is active (low), the address for the access appears on the address bus 26.

R/*W indicates whether the processor access is a read or a write access. If the access is a read access, this signal will be high and if the access if a write access, this signal will be low.

*BURST is a control signal generated by the microprocessor to indicate a burst-mode access. When this signal is active low, it indicates to the memory 14 that a sequential, interleaved memory access is being requested by the processor 12 within the page mode being assumed.

*RDY indicates, for a read access, that a valid data o instruction word is on the data/instruction bus 24. For a write access, this signal indicates that the access is complete and that data need no longer be driven by the processor 12 on the data/instruction bus 24.

Lastly, *ERLYA is generated by the memory controller 20 in response to the *BURST signal generated by the processor 12. This signal, as will be seen hereinafter, causes the processor 12, during its sequential access, to provide sequential addresses for only memory bank 16 which, as will be seen hereinafter, results in the early transmission of burst-mode addresses.

Figure 2:
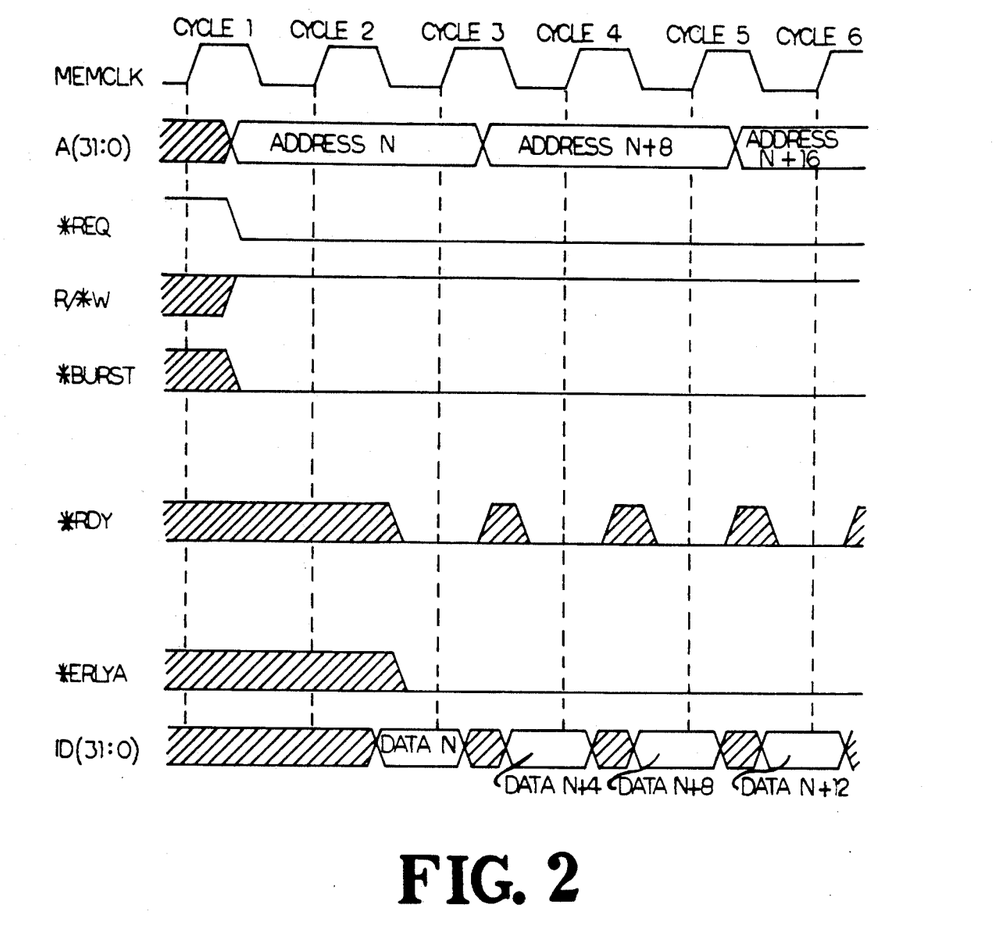
FIG. 2 is a series of waveforms which may be referred to in understanding the manner in which the processing system of FIG. 1 may be implemented in accordance with the present invention.

Referring now to FIG. 2, it illustrates waveforms which represent the manner in which the processing system 10 may be implemented in practicing the present invention in accordance with this first preferred embodiment. As can be seen from the Figure, waveforms representing the system clock (MEMCLK), the address bits, the access request signal, the read or write control signal, the burst control signal, the ready signal, the early addressing signal, and the data/instruction bus bits are represented during six system clock cycles starting with the request for a sequential memory access by the processor 12.

The processor 12 initiates the sequential memory access during the high phase of the system clock cycle 1. At this time, the processor 12 places address N onto the bus, drives the memory access request signal to an active low, drives the read/write control signal high to indicate a read access, and drives the *BURST control signal low to indicate to the memory controller 20 that a sequential access has been requested. As will be noted in FIG. 2, the processor 12 holds the address N on the address bus valid for two complete system clock cycles.

During the low phase of the system clock cycle 2, the memory controller 20 drives the *RDY control signal low to indicate that the data or instruction from memory bank 16 is currently on the data/instruction bus 24 and also drives *ERLYA control signal to an active low in response to the processor driving *BURST low during the high phase of the system clock cycle 1. At this time, the requested data or instruction word stored at address N in memory bank 16 is currently on the data/instruction bus to be read by the processor 12.

During the high phase of system clock cycle 3, the processor 12 then generates the next sequential address for memory bank 16 which is address N+8. Because the memory controller 20 received the A(2) address bit of zero from the microprocessor 12, it sequences memory bank 18 to activate memory bank 18 to cause that memory bank to provide the data or instruction word stored at address N+4 onto the data/instruction bus 24 during the low phase of system clock cycle 3 at the same time the memory controller 20 drives the *RDY control signal to an active low to indicate to the processor 12 that the data or instruction word stored at memory location N+4 of memory bank 18 is currently on the data/instruction bus 24.

In response to the address N+8 on the address bus 26, the memory bank 16 then provides the data or instruction word stored at address N+8 on the data/instruction bus 24 during the low phase of the system clock cycle 4. At the same time, the memory controller 20 drives the *RDY control signal to an active low to inform the processor 12 that the data or instruction word stored at address N+8 of memory bank 16 is currently on the data/instruction bus 24.

The foregoing sequence continues until the sequential memory access of processor 12 is complete. As can be seen from the foregoing, even though a simple or single access by processor 12 normally takes two system clock cycles to complete, because the memory controller 20 activates memory bank 18 in between the addresses generated by processor 12 for memory bank 16, the processor 12 is able to obtain a data or instruction word from the memory 14 during each system clock cycle. In addition, this improved efficiency in sequential accessing results from the fact that the microprocessor 12 can provide the addresses for memory bank 16 early. If the sequential address were to be conducted as a series of simple accesses, the microprocessor would have provided address N+4 during the high phase of system clock cycle 3 and held that address valid until the high phase of system clock cycle 5. However, by virtue of the present invention, the processor 12 can provide address N+8 early when it otherwise would have provided address N+4.

As a result, the *ERLYA control signal provided by the memory controller 20 causes the processor 12 to address only memory bank 16. Further, the memory controller 20 sequences the other memory bank, memory bank 18, in between the accesses of memory bank 16 by the processor 12.

While FIG. 2 illustrates the sequential accessing by processor 12 of memory 14 for a read access, the same waveforms would result for a write access except that the R/*W control signal would have been driven to an active low by the processor 12 during the high phase of system clock cycle 1 and would have driven the data for storage in storage location having address N onto the data/instruction bus 24 during the high phase of system clock cycle 2. From there, the sequence of events would have been as illustrated to permit the processor 12 to write data words to memory 14 at a rate of one data word per clock cycle with the data words being alternately stored in memory bank 16 and memory bank 18 during alternate system clock cycles.

Figure 3:
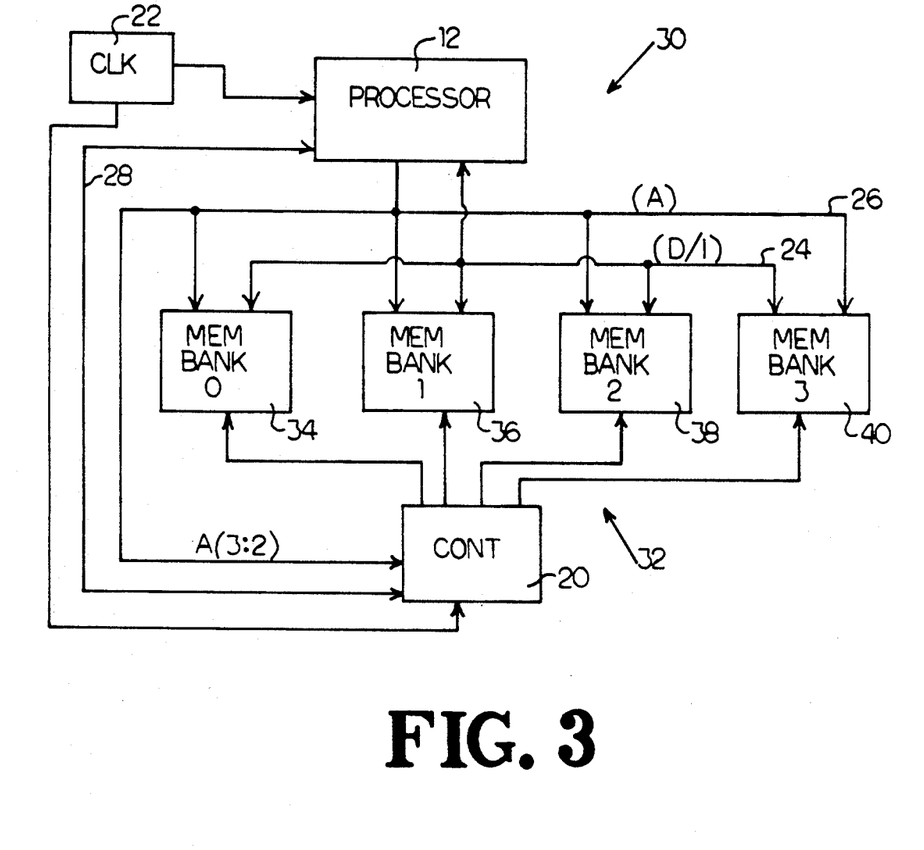
FIG. 3 is a schematic block diagram of a processing system which includes a memory having four memory banks in accordance with a second embodiment of the present invention.

Referring now to FIG. 3, it illustrates another processing system 30 structured in accordance with a second preferred embodiment of the present invention. The processing system 30 generally includes the processor 12, the system clock 22, the memory controller 20, and a memory 32 comprising a first memory bank 34, a second memory bank 36, a third memory bank 38, and a fourth memory bank 40. In a manner similar to the embodiment of FIG. 1, the processor is coupled to the memory banks 34, 36, 38 and 40 by a data/instruction bus 24 for conveying data or instruction words between the processor 12 and memory 32 and an address bus 24 to permit the processor 12 to address the addressable storage locations of memory banks 34, 36, 38 and 40. The processor is also coupled to the memory controller 20 by the control bus 28 for conveying the same control signals as previously described with respect to the embodiment of FIG. 1. Also, the memory controller 20 is coupled to the address bus 24 for receiving address bus bits A(3) and A(2).

Like the processing system embodiment of FIG. 1, the system clock 22 may be external to the processor 12 as illustrated or may be internal to the processor 12. Also, like the processing system embodiment of FIG. 1, the data/instruction bus 24 is preferably a 32-bit bus conveying data or instruction words having bits 0 through 31 and the address bus 26 is also preferably a 32-bit bus conveying address bits 0 through 31.

The memory banks 34, 36, 38 and 40 also preferably include a plurality of addressable storage locations wherein a storage location of one bank finds a corresponding storage location in the other banks with the addresses of the corresponding memory locations differing by the state of the address bits A(3) and A(2). When these address bits are both zeroes, memory bank 34 is addressed, when A(3) is zero and A(2) is one, memory bank 36 is addressed, when A(3) is one and A(2) is zero, memory bank 38 is addressed, and when both of these bits are ones, memory bank 40 is addressed. As previously mentioned, the memory controller 20 is coupled to the address bus 2 for receiving the condition of these address bits. The memory controller 20 is also coupled to each of the memory banks 34, 36, 38 and 40, for sequencing the memory banks in a manner to be described hereinafter.

The processing system 30 includes four memory banks because it preferably is arranged to allow a single memory access by processor 12 to memory 32 to be completed within four clock cycles of the system clock 22. As will be seen hereinafter, when the processor 12 initiates a sequential memory access of memory 32, the memory controller 20 will sequence memory banks 36, 38 and 40, to provide the processor 12 with data or instruction words at a rate of one word per system clock cycle or to permit the processor 12 to write data words to the memory 32 at a rate of one data word per system clock cycle.

Figure 4:
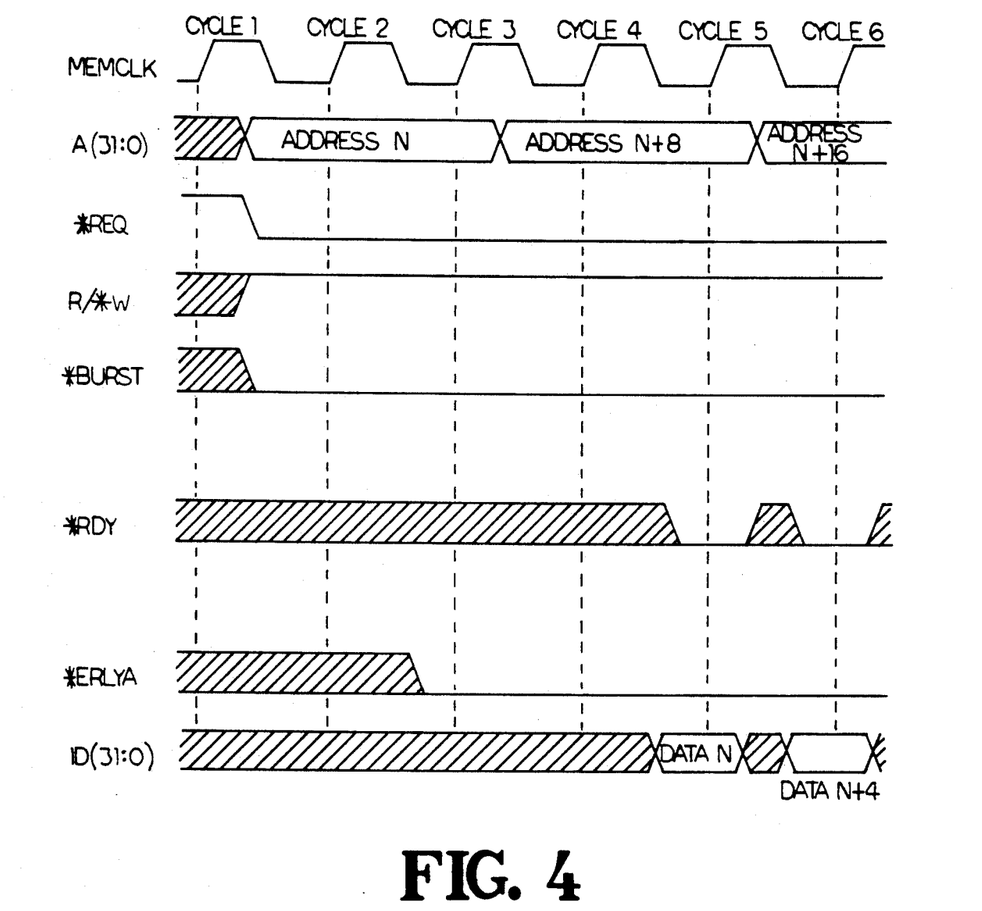
FIG. 4 is a series of waveforms which may be referred to in understanding the manner in which the processing system of FIG. 3 may be implemented in accordance with the present invention.

Referring now to FIG. 4, a sequential read access is initiated by processor 12 during the high phase of system clock cycle 1. At this time, the processor 12 provides address N to address memory bank 34, drives the *REQ control signal to an active low to request the memory access, drives the R/*W control signal high to indicate that the access is a read access and drives the *BURST control signal active low to inform the memory controller 20 that the access is a sequential access. During the low phase of the system clock cycle 2, the processor 12 is holding address N valid, the memory controller 20 generates the *ERLYA control signal to an active low which will cause, as will be seen hereinafter, the processor 12 to address only the memory storage locations of memory bank 34 in sequence.

During the high phase of system clock cycle 3, the processor 12 generates address N+8. The generation of N+8 is done by convention to simplify the processor hardware. However, without departing from the present invention, the microprocessor 12 could have held the address N active from the high phase of cycle 1 to the high phase of cycle 5 as well.

It will be noted that the data stored at address N is provided to the data/instruction bus 24 during the low phase of cycle 4 at the same time that the memory controller drives the *RDY control signal to an active low to indicate to the processor 12 that the requested data from address N is currently on the data/instruction bus 24. Even though the processor 12 generates address N+16 during the high phase of cycle 5, the memory controller 20 sequences the memory banks 36, 38 and 40, during successive system clock cycles to provide the data stored at address N+4 of memory bank 36 to the data/instruction bus 24 during the low phase of cycle 6 along with the *RDY control signal driven to an active low. The foregoing sequence continues until the sequential access is completed by the processor 12.

As can be seen from the foregoing, with the four-bank interleaved embodiment of FIG. 3, the processor 12 only addresses memory bank 34. When the memory controller 20 senses that the A(3) and A(2) bits are both zeroes, it will sequence memory banks 36, 38 and 40, during successive system clock cycles to enable the processor 12 to receive data or instruction words from the memory 32 at a rate of one word per system clock cycle.

As with the embodiment of FIGS. 1 and 2, the waveforms of FIG. 4 would be essentially identical for a processor write access except that the R/*W control signal would have been driven to an active low by the processor during the high phase of cycle one and the processor would have provided the data for storage at address N on the data/instruction bus 24 during the high phase of cycle 4. Otherwise, the sequence of events would have been identical.

As an alternative embodiment, if the processing system 30 was arranged to complete a simple access in two system clock cycles, the memory controller 20 could cause the processor 12 to address memory banks 34 and 38 and the memory controller 20 could then have sequenced memory banks 36 and 40 in the proper sequence to provide the sequential accessing by the processor 12 without departing from the present invention.

As can be seen from the foregoing, the present invention provides a processing system having improved efficiency for accessing memory during sequential memory accesses. Even though a simple access may take multiple clock cycles, by virtue of the present invention, sequential memory accesses may be accomplished by the processor at a rate of one word per system clock cycle.

While particular embodiments of the present invention has been shown and described, modifications may be made, and it is therefore intended to cover in the appended claims all such changes and modifications which fall within the true spirit and scope of the invention.

What is claimed is:

1. A processing system comprising:
   memory means including a plurality of storage locations, each of said plurality of storage locations being addressable at a respective storage address;
   a processor coupled to said memory means for accessing said plurality of storage locations; and
   control means coupled to said memory means and to said processor, said control means being responsive to said processor for effecting a sequential access of said memory means in a predetermined sequence by causing said processor to sequentially address selected first storage locations of said plurality of storage locations and by said control means sequentially accessing selected second storage locations of said plurality of storage locations; said selected first storage locations and said selected second storage locations being alternately arranged; said control means accessing of a particular said second storage location of said selected storage locations being effected substantially concurrently with said processor addressing a later-sequential said first storage location of said selected first storage locations; said later-sequential first storage location being later in said predetermined sequence than said particular second storage location.

2. A processing system as defined in claim 1 wherein said memory means comprise first and second memory banks, said first memory bank containing a first set of storage locations of said plurality of storage locations and said second memory bank containing a second set of storage locations of said plurality of storage locations, wherein said control means is arranged to cause said processor to sequentially address said first set of storage locations, and wherein said control means is arranged to access said second set of storage locations.

3. A processing system as defined in claim 1 wherein said memory means comprises a plurality of memory banks, wherein said control means is arranged to cause said processor to address a first memory bank of said plurality of memory banks and wherein said control means is arranged to access other memory banks of said plurality of memory banks than said first memory bank.

4. A processing system as defined in claim 3 wherein said plurality of memory banks comprises four memory banks.

5. A processing system as defined in claim 1 wherein said memory means comprises a plurality of memory banks, wherein said control means is arranged to cause said processor to sequentially address a first set of memory banks of said plurality of memory banks, and wherein said control means is arranged for accessing a second set of memory banks of said plurality of memory banks, said first set of memory banks and said second set of memory banks being alternately arranged.

6. A processing system as defined in claim 5 wherein said memory means comprises first, second, third and fourth memory banks, wherein said control means is arranged to cause said processor is address said first and third memory banks and wherein said control means is arranged to access said second and fourth memory banks.

7. A processing system as defined in claim 1 wherein said processor is arranged to provide a first control signal when initiating said sequential access of said memory means and wherein said control means is responsive to said first control signal.

8. A processing system as defined in claim 7 wherein said control means is arranged to provide a second control signal responsive to said first control signal to cause said processor to address said selected first storage locations.

9. A processing system as defined in claim 1 wherein said processor is arranged to initiate either a sequential read access or a sequential write access to said memory means.

10. A processing system as defined in claim 1 further including a first bus between said processor and said memory means for conveying data between said processor and said memory means and a second bus between said processor and said memory means for conveying said storage addresses from said processor to said memory means.

11. A processing system as defined in claim 1 further including a system clock coupled to said processor and said memory means, said system clock providing a repetitive clock cycle timing signal to control the timing of said processor and said memory means, wherein said processor is arranged to hold each said storage address valid during multiple cycles of said system clock and wherein said control means is arranged to access said second storage locations as said storage addresses are held valid by said processor to permit said processor to write a word of data to or read a word of data from said memory means during each said cycle of said system clock.

12. A processing system comprising:
memory means including a plurality of memory banks for storing data and operating instructions at a plurality of addressable storage locations, each of said storage locations being identified by a memory location address;
a processor for generating said memory location addresses for accessing said plurality of memory banks to store or retrieve said data and said operating instructions, said processor executing operations upon data retrieved by said accessing responsive to operating instructions retrieved by said accessing;
a first bus coupled between said processor and said memory means for conveying said data and operating instructions between said processor and said memory means;
a second bus coupled between said processor and said memory means for conveying said memory location addresses from said processor to said memory means; and
control means coupled to said plurality of memory banks and to said processor, said control means being responsive to a sequential memory access request of said processor for generating a control signal to cause said processor to sequentially address in a predetermined sequence a first set of memory banks of said plurality of memory banks and to cause said control means to sequentially access in said predetermined sequence other said memory banks of said plurality of memory banks than said first set of memory banks between said sequential addressing of said first set of memory banks; said control means accessing a particular other said memory bank than said first set of memory banks being effected substantially concurrently with said processor addressing a later-sequential memory bank of said first set of memory banks; said later-sequential memory bank being later in said predetermined sequence than said particular other said memory bank.

13. A processing system as defined in claim 12 wherein said plurality of memory banks comprises first and second memory banks, wherein said control means is arranged to cause said processor to sequentially address a first set of storage locations of said plurality of storage locations associated with said first memory bank, and wherein said control means is arranged to sequence a second set of storage locations of said plurality of storage locations associated with said second memory bank.

14. A processing system as defined in claim 12 wherein said control signal is arranged to cause said processor to address a first memory bank of said plurality of memory banks and wherein said control means is arranged to sequence other memory banks of said plurality of memory banks than said first memory bank.

15. A processing system as defined in claim 14 wherein said plurality of memory banks comprises four memory banks.

16. A processing system as defined in claim 12 wherein said control means is arranged to cause said processor to sequentially address a first set of memory banks of said plurality of memory banks, and wherein said control means is arranged for sequencing a second set of memory banks of said plurality of memory banks, said first set of memory banks and said second set of memory banks being alternately arranged.

17. A processing system as defined in claim 16 wherein said plurality of memory banks comprises first, second, third and fourth memory banks, wherein said control means is arranged to cause said processor to address said first and third memory banks, and wherein said control means is arranged to sequence said second and fourth memory banks.

18. A processing system as defined in claim 12 wherein said processor is arranged to initiate either a sequential read access from or a sequential write access to said memory means.

19. A processing system as defined in claim 12 further including a system clock coupled to said processor and said memory means, said system clock providing a repetitive clock cycle timing signal to control the timing of said processor and said memory means, wherein said processor is arranged to hold a respective said memory location address for a selected storage location of said plurality of storage locations valid during multiple cycles of said system clock and wherein said control means is arranged to sequence other storage locations than said selected storage location as said respective memory address is held valid by said processor to permit said processor to write a word of data to or read a word of data from said memory means during each said cycle of said system clock.

20. A processing system comprising:
memory means including a plurality of memory banks, each memory bank of said plurality of memory banks including a plurality of addressable memory locations for storing data and operating instructions, each memory location of said plurality of memory locations being identified by a storage location address;
a processor for executing operations upon said data in accordance with said operating instructions and for generating said storage location addresses to access said memory means for reading said data and operating instructions from said plurality of memory banks or writing data to said plurality of memory banks, said processor being arranged to provide a first control signal when initiating a sequential access to said memory means;
a first bus coupled between said processor and said memory means for conveying said data and operating instructions between said processor and said memory means;
a second bus coupled between said processor and said memory means for conveying said storage location addresses from said processor to said memory means;
control means coupled to said plurality of memory banks and to said processor, said control means being responsive to said first control signal for causing said processor to generate sequential storage location addresses for a first set of memory banks of said plurality of memory banks and for sequencing other sets of memory banks of said plurality of memory banks than said first set of memory banks between said sequential storage location addresses generated by said processor; and a system clock for providing a repetitive clock cycle timing signal to control the timing of said sequential access to said memory means by said processor, said processor being arranged to hold a respective said storage location address generated for said first set of memory banks valid during multiple cycles of said system clock, and said control means being arranged to sequence other sets of memory banks of said plurality of memory banks than said first set of memory banks as each said respective storage location address is held valid by said processor to permit said processor to access a different memory location of said plurality of memory locations during each said clock cycle.

21. A processing system comprising:

memory means including a plurality of storage locations, each of said plurality of storage locations being addressable at a respective storage address;

a processor coupled to said memory means for accessing said plurality of storage locations;

control means coupled to said memory means and to said processor, said control means being responsive to said processor for effecting a sequential access of said memory means in a predetermined sequence by causing said processor to sequentially address selected first storage locations of said plurality of storage locations and by said control means sequentially accessing selected second storage locations of said plurality of storage locations said selected first storage locations and said selected second storage locations being alternately arranged; and a system clock coupled to said processor and said memory means, said system clock providing a repetitive clock cycle timing signal to control the timing of said processor and said memory means; said processor being arranged to hold each said storage address valid during multiple cycles of said system clock; said control means being arranged to access said second storage locations as said storage addresses are held valid by said processor to permit said processor to write a word of data to or read a word of data from said memory means during each said cycle of said system clock.

22. A processing system comprising: memory means including a plurality of memory banks for storing data and operating instructions at a plurality of addressable storage locations, each of said storage locations being identified by a memory location address;

a processor for generating said memory location addresses for accessing said plurality of memory banks to store or retrieve said data and said operating instructions, said processor executing operations upon data retrieved by said accessing responsive to operating instructions retrieved by said accessing;

a first bus coupled between said processor and said memory means for conveying said data and operating instructions between said processor and said memory means;

a second bus coupled between said processor and said memory means for conveying said memory location addresses from said processor to said memory means;

control means coupled to said plurality of memory banks and to said processor, said control means being responsive to a sequential memory access request of said processor for generating a control signal to cause said processor to sequentially address in a predetermined sequence a first set of memory banks of said plurality of memory banks and to cause said control means to sequentially access in said predetermined sequence other said memory banks of said plurality of memory banks than said first set of memory banks between said sequential addressing of said first set of memory banks; and a system clock coupled to said processor and said memory means, said system clock providing a repetitive clock cycle timing signal to control the timing of said processor and said memory means; said processor being arranged to hold a respective said memory location address for a selected storage location of said plurality of storage locations valid during multiple cycles of said system clock; said control means being arranged to sequence other storage locations than said selected storage location as said respective memory address is held valid by said processor to permit said processor to write a word of data to or read a word of data from said memory means during each said cycle of said system clock.

* * * * *